March 11, 1941.                M. GALLO                 2,234,432
MACHINE FOR FORMING PLASTIC MATERIALS
Filed May 15, 1940
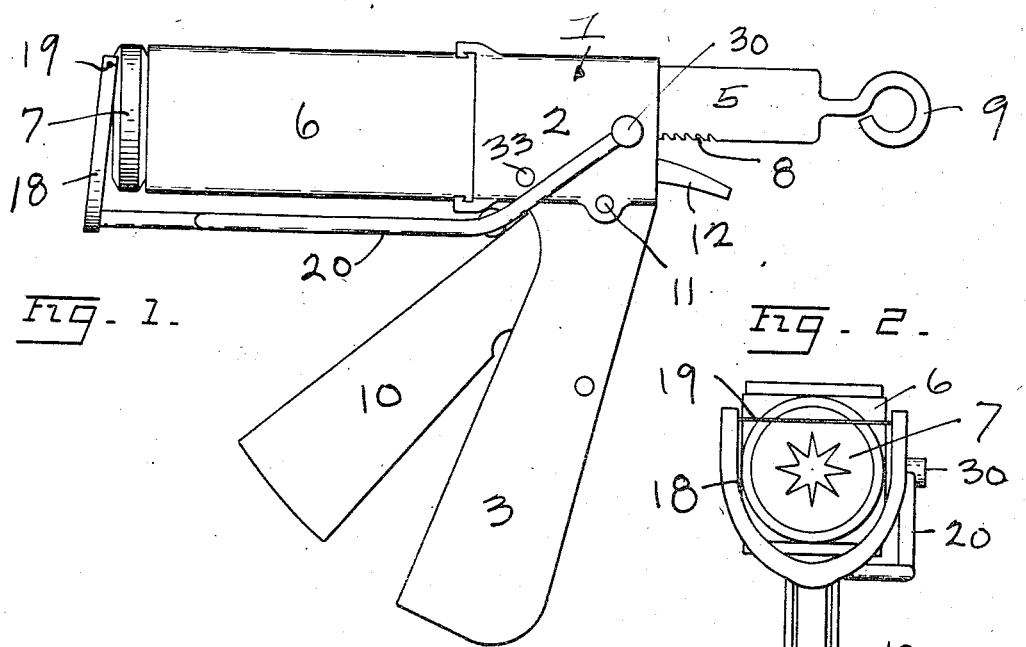
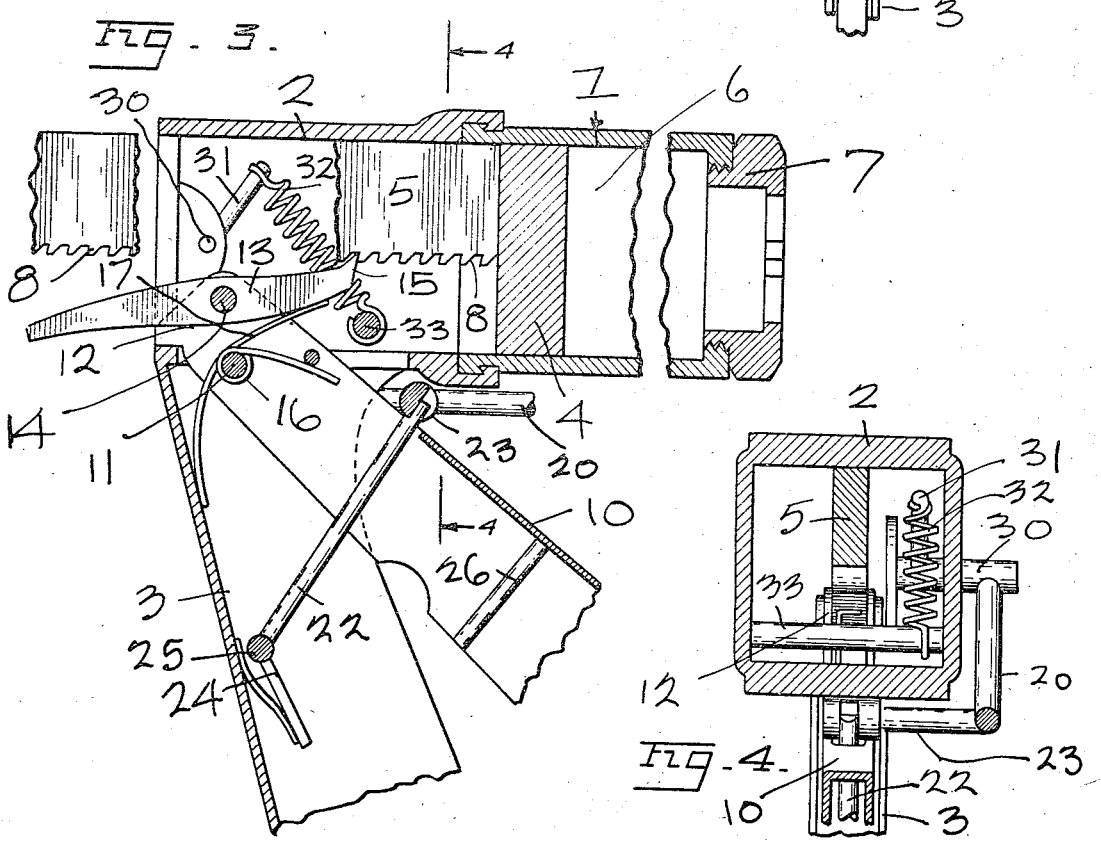
INVENTOR.
MARIO GALLO
BY
ATTORNEY.

Patented Mar. 11, 1941

2,234,432

UNITED STATES PATENT OFFICE 2,234,432

MACHINE FOR FORMING PLASTIC MATERIALS

Mario Gallo, San Francisco, Calif.

Application May 15, 1940, Serial No. 335,292

1 Claim. (Cl. 107—52)

This invention relates particularly to a device or machine from which substances such as butter, cookie dough and the like may be discharged in a selected design and automatically cut to the shape or size desired.

An object of the invention is to provide a portable machine for pre-forming pats of butter, or cookie dough pats, or similar articles to be formed of material of the consistency of butter or dough, the machine having a chamber within which a bulk supply of butter or dough material is contained and from which selected amounts of the said material are discharged by manual manipulation of the machine, the amount of material discharged in each cycle of operation being subject to the control of the machine operator, this machine permitting a greater volume of work to be turned out than by any other similar known apparatus of which applicant has any knowledge.

Other objects and advantages of the invention are to provide a machine for pre-forming plastic materials that will be superior in point of simplicity, inexpensiveness of construction, positiveness of operation, and facility and convenience in use and general efficiency.

In this specification and the annexed drawing, the invention is illustrated in the form considered to be the best, but it is to be understood that the invention is not limited to such form, because it may be embodied in other forms; and it is also to be understood that in and by the claim following the description, it is desired to cover the invention in whatsoever form it may be embodied.

In the accompanying drawing:

Fig. 1 is a side elevation of device constructed in accordance with my invention.

Fig. 2 is an end view of Fig. 1.

Fig. 3 is an enlarged longitudinal section taken through the device shown in Fig. 1.

Fig. 4 is a cross section taken through Fig. 3 on the line 4—4.

In detail the construction illustrated in the drawing comprises a frame member 1 having a body portion 2 thereon from which a handle member 3 depends. In the present illustration the body 2 is preferably rectangular in cross-section, although it would be within the purview of the invention to utilize any desired cross-sectional shape.

A plunger 4 is arranged within the body member 2, said plunger having a cross-section corresponding to that of the interior of the body. The plunger 4 is adapted to slidably engage the inner walls of the body 2 and is provided with a stem 5 which extends rearwardly through the end wall of the body 2.

The forward end of the body 2 is provided with a barrel or chamber 6 detachably mounted thereon in flush axial alignment therewith. The barrel 6 has a cross-section which corresponds exactly to that of the interior of the body 2 in order that the plunger 4 may, in the operation of the device, move the full length of the barrel 6. The discharge end of the barrel 6 is provided with a removable die or form 7 which is designed to form or cut the butter or cookie dough into any desired selected shape. The die 7 is made removable in order that other dies of different shapes may be secured to the end of the barrel.

In the operation of the device, the barrel 6 is loaded with the material to be extruded or discharged and the plunger 4 is pulled into the body 2 so that the plunger will, when operated, move against the material in the barrel and cause the same to be extruded out through the die 7. In order to accomplish this purpose I have provided a series of laterally disposed teeth 8 along the under side of the plunger stem 5, said stem 5 preferably having a flat sided shape to engage a complementary slot in the end wall of the body 2. The end of the stem 5 is provided with a handle 9 thereon for the purpose of assisting in manually pulling the plunger 4 into the loaded or cocked position in the body 2.

The handle member 3 on the body 2 is provided with a trigger member 10 which is pivoted thereto in the upper portion thereof at 11, the upper end of the trigger having sides 12 thereof extended upwardly into the interior of the body 2. A pawl 13 is pivoted intermediate its opposite ends on a pin 14 which is journaled in the handle sides 12. One end of the pawl 13 is provided with a tooth 15 thereon to engage the ratchet teeth 8 on the stem 5, while the other end of the pawl projects outwardly through the rear end of the body 2 beneath and in line with the stem 5. A coil spring 16 is provided around the trigger pivot 11 to maintain the said trigger in a normal angular position relative to the handle 9. Similarly a spring 17 is provided around the pawl tooth 14 to maintain the teeth 15 on the pawl in contact with the ratchet teeth 8 on the stem 5.

When the device is held in the hand of an operator, by the handle member 3 and the pressure of the fingers is applied against the trigger 10, the arcuate movement of the trigger 10 causes a corresponding arcuate movement of the pawl 13, which forces the stem 5 and plunger 4 a distance of one notch or tooth forwardly into the barrel 6. Upon the release of the finger pressure applied to the trigger 10, the pawl 13 rides back and engages the tooth immediately in the rear of the one with which it was first engaged. Constant manipulation of the trigger 10 will cause the plunger 4 to move progressively forward in a step by step movement, and with each actuation of the plunger, the bulk material held in the barrel 6 will be extruded or discharged therefrom.

In order to cut off the material which is extruded or discharged from the barrel 6, I have provided a U-shaped frame 18, the upper ends of which have a very fine diametered wire 19 provided thereon. The wire 19 on the frame 18 is adapted to be reciprocated across the face of the die 7 and to cut off the extruded or discharged material. The U-shaped frame 18 is carried on a bar 20, the end of which is rotatably journaled in the side of the body 2 to keep the cutting off wire in a constantly elevated position. In order that the cutting off wire will not commence to work until after the material has been completely extruded from the barrel, and then only with a sharp, quickly reciprocated movement, I have provided a latch member 22 which is adapted to engage an arm 23 on the bar 20 to hold the bar 20, U-frame 18 and wire 19 in a locked up position. The latch 22 is secured to a bell crank 24 which is pivoted at 25 in the handle 3. The latch 22 is disengaged from the arm 23 by means of a striker pin 26 on the trigger 10 engaging the free end of the bell crank 24. The location of the striker pin 26 on the trigger 10 is such that the striker pin will not engage the bell crank 24 to disengage the latch 22 from the arm 23 until the trigger 10 reaches the extreme end point of its arcuate movement, whereupon disengagement of the latch 22 from the arm 23 permits the tension spring 21 to force the bar 20, U-shaped frame 18 and cutting off wire 19 downwardly with a very fast, sharp action, causing the extruded material to be cut off from the barrel 6.

When the extruded material has been completely discharged from the barrel 6, then the plunger 4 is pulled rearwardly into the body 2, the barrel 6 is removed, refilled and then replaced on the body 2 for continued operation.

The bar 20 is journaled in the body 2 on a shaft 30, the said shaft having a leg 31 thereon within the body 2 to which an end of a spring 32 is attached, the other end of said spring being anchored to a cross pin 33 in the body 2. The spring 32 serves to pull the wire cutter 19 down across the extruded material and to sever it from the former die with a very fast, snappy movement.

Having thus described this invention, what I claim and desire to secure by Letters Patent is:

A portable device for forming wafers from plastics, comprising a cylindrical container for bulk plastics; a die for preforming the plastic as it is extruded from an end of said container; a carrier for said container having means thereon for detachably supporting said container; a plunger slidably confined in said carrier; a manually operated trigger and pawl on the carrier to advance said plunger intermittently into the container against the plastic to force the same from said container; a plastic cut-off means consisting of a U shaped frame having a wire stretched across the legs thereof pivotally mounted on the carrier to reciprocate adjacent the extruding die; and means on said trigger to automatically operate said plastic cut off means at the termination of the trigger stroke across the outer face of the die, and a spring to return the cut off means to position for further operation.

MARIO GALLO.